(12) United States Patent
Ishigami et al.

(10) Patent No.: US 7,436,997 B2
(45) Date of Patent: Oct. 14, 2008

(54) LIGHT SOURCE ESTIMATING DEVICE, LIGHT SOURCE ESTIMATING METHOD, AND IMAGING DEVICE AND IMAGE PROCESSING METHOD

(75) Inventors: Koichiro Ishigami, Kanagawa (JP); Naoya Katoh, Chiba (JP)

(73) Assignee: Sony Corporation, Tokyo (JP)

( * ) Notice: Subject to any disclaimer, the term of this patent is extended or adjusted under 35 U.S.C. 154(b) by 554 days.

(21) Appl. No.: 10/534,432

(22) PCT Filed: Nov. 12, 2003

(86) PCT No.: PCT/JP03/14377

§ 371 (c)(1),
(2), (4) Date: Nov. 14, 2005

(87) PCT Pub. No.: WO2004/045219

PCT Pub. Date: May 27, 2004

(65) Prior Publication Data

US 2006/0103728 A1        May 18, 2006

(30) Foreign Application Priority Data

Nov. 12, 2002    (JP) .............................. 2002-328719

(51) Int. Cl.
*G06K 9/00* (2006.01)
(52) U.S. Cl. ...................... 382/167; 382/274
(58) Field of Classification Search ................. 382/162, 382/267, 274; 348/223.1, 224.1; 358/516, 358/518
See application file for complete search history.

(56) References Cited

U.S. PATENT DOCUMENTS

| 7,184,080 B2 * | 2/2007 | Kehtarnavaz et al. ..... 348/223.1 |
| 7,362,357 B2 * | 4/2008 | Brown et al. ............. 348/224.1 |
| 2001/0040588 A1 | 11/2001 | Shiraiwa et al. |

FOREIGN PATENT DOCUMENTS

| EP | 0 891 077 | 1/1999 |
| JP | 5-111059 | 4/1993 |
| JP | 11-25252 | 1/1999 |
| JP | 2001-186540 | 7/2001 |
| JP | 2001-311666 | 11/2001 |

* cited by examiner

*Primary Examiner*—Phuoc Tran
(74) *Attorney, Agent, or Firm*—Frommer Lawrence & Haug LLP; William S. Frommer

(57) ABSTRACT

A light source estimation method of this invention estimates from the sensor response the color characteristics of an unknown light source of an image-pickup scene, in order to improve white balance adjustment and other aspects of the quality of color reproduction; a projection conversion portion 6 projects sensor response values 5 into an image distribution 9 in an evaluation space not dependent on the image-pickup light source 2 using parameters obtained by operations which can be calorimetrically approximated from spectral sensitivity characteristics of image-pickup unit 4, which are known, and from spectral characteristics of an assumed test light source 1; an evaluation portion 10 evaluates the correctness of a plurality of the test light sources 1 based on the distribution state of sample values of the projected scene; and accordingly, the correct image-pickup light source 2 is estimated.

33 Claims, 10 Drawing Sheets

Equal Intervals

Fine Division Over
a Specific Interval

Multiple Light Sources

FIG. 9

LIGHT SOURCE ESTIMATING DEVICE, LIGHT SOURCE ESTIMATING METHOD, AND IMAGING DEVICE AND IMAGE PROCESSING METHOD

TECHNICAL FIELD

The present invention relates to a light source estimation apparatus, light source estimation method, image-pickup apparatus, and image processing method in which, for example, image-pickup means having a plurality of different spectral sensitivity characteristics uses sensor response values obtained when photographing the image of an unspecified arbitrary object to estimate the spectral characteristics indicating the color of the unknown photographing light source which had been irradiating an object.

BACKGROUND ART

The light which is incident on the human eye to enable vision is a portion of the radiant energy due to illumination which has been reflected by an object which is seen and has propagated through the air; although the human vision system cannot directly measure the characteristics of objects and illumination, objects can be identified with a degree of reliability even under illumination having unknown chromatic characteristics. This property is called color constancy, and for example enables a white object surface to be perceived as white.

On the other hand, in digital still cameras, digital video cameras and other electronic image-pickup equipment, scenes are picked up as images through the response of a CCD (Charge Coupled Device) or other photosensor; however, because in general the balance of sensor response among the R, G, B, or other color channels is constant, in order to form an image in a state in which the appearance is natural in accordance with the scene illumination, a correction mechanism is necessary to adjust the balance between channels. If the balance is not adequately adjusted, to the viewer of the image, places normally recognized as achromatic objects will be reproduced as colored in the image, or objects will be reproduced with a color different from the color remembered, so an unnatural impression is imparted; hence balance adjustment is extremely important for color reproduction of an image.

Balance adjustment among channels can be performed by, for example, correction of achromatic colors called white balance in the gain adjustment of each channel; by correcting the color rendering properties of the light source through linear matrix transformation of signals among channels (Patent Reference 1); or by matching to the different sensitivity responses of the sensors of image-pickup equipment, vision systems and similar. However, whichever method is used, the correction mechanism must use some means to obtain correction parameters appropriate to the scene. For example, the following equations (1) and (2) can be used to calculate appropriate gain values for adjustment of the white balance of sensors with a RGB three-channel response which is linear with respect to the quantity of light, together with the spectral sensitivity characteristics of the image-pickup system, if the spectral distribution of the light source for the photographed scene is known.

$$\begin{bmatrix} R_w \\ G_w \\ B_w \end{bmatrix} = SI \quad (1)$$

where S is a matrix indicating the sensor sensitivity (three channels×number n of wavelength samples), and I is a column vector indicating the spectral distribution of the light source (number n of wavelength samples).

$$g_R = G_w/R_w, g_G = G_w/G_w = 1.0, g_B = G_w/B_w \quad (2)$$

However, for the image-pickup equipment, information relating to objects existing in the scene at the time of image pickup without calibration or the like and the illuminating light sources of the scene are normally unknown; and adjustment parameters appropriate to the scene, or the chromatic characteristics of the illuminating light source necessary to determine those parameters, must be identified from the response results of a dedicated sensor or sensor for image pickup, constituting a problem known as the light source estimation problem or the color constancy problem.

In the field of vision studies, various algorithms and calculation models began to be proposed from around 1980, and apart from these, techniques based on empirical knowledge have been incorporated in conventional color image-pickup equipment, the estimation performance of which has advanced through the years. Recently, applications to robotics and other artificial vision systems have also been anticipated.

One of the most widely used algorithms extracts the color components of the light source from average values of sensor response and the projection thereof onto a black body locus, based on the assumption that the spatial average over the scene of the surface reflectivity of an object is close to gray (Non-patent Reference 1, Non-patent Reference 2), and is used in a variety of modes, such as simply averaging the sensor response among pixels, averaging pixels within the range of a specified brightness level, or changing the range or weighting of sampling depending on the position in space. There are also a method in which color components of the light source are extracted from sampling results for pixels with high response values, assuming that the area with the highest brightness level corresponds to a white surface close to a perfectly diffuse reflecting surface (Patent Reference 2), and a method in which an area of high brightness level is assumed to be a specular reflecting component, and the light source is estimated from the distribution of the response values (Non-patent Reference 3). Because these methods are based on an assumption about an object surface, which should be physically independent of the light source, it is known that depending on the scene, the results of light source estimation may be greatly affected by the state of an object which deviates from the assumptions made.

There are also a study in which, by assuming a reflection model in which an object surface is a diffuse reflecting surface, and approximating the spectral characteristics of the light source and of the object surface by a linear model of few dimensions, reconstruction is attempted through linear calculations using a vector space different from that of the sensor response (Non-patent Reference 4), and a study in which constraining conditions, such as that the spectral reflectivity of an object surface must physically be in the range 0 to 1, are applied to select a light source with high probability (Non-patent Reference 5); however, in generalized image-pickup systems with few response channels, these do not independently provide sufficient estimation performance. Further, although the volume of computations is increased, there has also been proposed a method of integrating a plurality of known assumptions and probabilistic distributions for the light source, object surfaces, image-pickup system and similar, to improve the accuracy of statistical estimation (Non-patent Reference 6).

In methods which apply reflection models in particular, rather than performing an estimate taking as the solution a single completely unknown light source, in some methods wide prior knowledge is utilized in a method of determination in which the most probable light sources are categorized or detected from among a number of light sources selected in advance as candidates; such methods may be advantageous in that calculations are comparatively simple and results can be output rapidly. As criteria for judging the reliability of the result, errors by restoring the sensor response itself under a fixed constraint condition may be used (Non-patent Reference 7) ; and there have been proposals for widely using distribution states in the color gamut within the sensor space, to efficiently quantify a correlation relationship through comparison with a color gamut, adopted in advance as a reference, or a weighted distribution (Non-patent Reference 8, Non-patent Reference 9, Non-patent Reference 10, Patent Reference 3).

Patent Reference 1: Published Japanese Patent Application No. 2002-142231

Patent Reference 2: Published Japanese Patent Application No. H9-55948

Patent Reference 3: Published Japanese Patent Application No. H5-191826

Non-patent Reference 1: G. Buchsbaum, "A Spatial Processor Model for Object Color Perception", J. Franklin Inst., 310, 1980

Non-patent Reference 2: E. H. Land, "Recent Advances in Retinex Theory", Vision Research, 26, 1986

Non-patent Reference 3: H. C. Lee, "Method for computing the scene-illuminant chromaticity from specular highlights", J. Opt. Soc. Am. A, Vol. 3, No. 10, 1986

Non-patent Reference 4: L. T. Maloney & B. A. Wandell, "Color Constancy: A method for recovering surface spectral reflectance", J. Opt. Soc. Am. A, 1986

Non-patent Reference 5: D. A. Forsyth, "A Novel Algorithm for Color Constancy", Int. J. Comput. Vision, 5, 1990

Non-patent Reference 6: D. H. Brainard & W. T. Freeman, "Bayesian color constancy", J. Opt. Soc. Am. A, Vol. 14, No. 7, 1997

Non-patent Reference 7: B. Tao, I. Tastl & N. Katoh, "Illumination Detection in Linear Space", Proc. 8th Color Imaging Conf., 2000

Non-patent Reference 8: Hewlett-Packard Company, Hubel et al., "White point determination using correlation matrix memory", U.S. Pat. No. 6,038,339

Non-patent Reference 9: G. D. Finlayson, P. M. Hubel & S. Hordley, "Color by correlation", Proc. 5th Color Imaging Conf., 1997

Non-patent Reference 10: S. Tominaga & B. A. Wandell, "Natural scene-illuminant estimation using the sensor correlation", Proc. IEEE, Vol. 90, No. 1, 2002

DISCLOSURE OF THE INVENTION

Generally, in order to use a light source estimation algorithm in image processing operations such as white balance processing within a digital camera, not only must the processing speed be fast, but at the time of implementation it is necessary that the costs of memory consumption and similar be low.

However, even in the cases of those among the above-described conventional algorithms which enable comparatively fast categorization and detection (Non-patent Reference 8, Non-patent Reference 9, Patent Reference 3), as indicated by the conceptual diagram of a conventional method to evaluate the reasonableness of test light sources in sensor response space in FIG. 10, while there is the possibility of improving the estimation accuracy as the number 1 to n of test light sources 101 set as candidates is increased, because comparative evaluations of the image distribution 106 for sensor response 105 to a picked-up image of an object 103 picked up by the image-pickup means 104 with reference distributions (1, 2, . . . , n) 108 stored in storage media 107 corresponding to the respective test light sources 101, are performed, by the comparison portion 109, in an image distribution 106 in sensor space dependent on the image-pickup light source 102, with scores of evaluation results (1, 2, . . . , n) 110 output, and the test light source judged to be most correct based on the score values 110 is judged to be the estimated light source O by the judgment portion 111; information for reference distributions (1, 2, . . . , n) 108 such as the color gamut, weighted distribution, target values, and so on used as comparison criteria for the correct light source must be held in storage media 107 in the same quantity as the number 1 to n of test light sources 101 selected for use, so there is a tendency for increased use of the ROM or other storage media 107, and therefore the problem of a combination of advantages and disadvantages with respect to accuracy and cost has remained.

Whereas the above methods create one image distribution for one picked up image by a fixed projection, and make the distribution become judgment criteria as compared with a plurality of reference distributions corresponding to a plurality of light sources assumed, in the present invention, a plurality of reference distributions generated by projections corresponding to a plurality of assumed light sources are compared with a single fixed reference distribution to be employed as the judgment criterion.

The present invention was devised in light of the above, and has as an object to provide a light source estimation apparatus, light source estimation method, image-pickup apparatus, and image processing method for estimating the color characteristics of an unknown light source of an image-pickup scene from the sensor response, in order to improve the automatic white balance adjustment and other aspects of color reproduction quality of color image-pickup equipment.

A light source estimation apparatus of this invention estimates the correct image-pickup light source by including: storage means for storing, for each test light source, parameters for projecting sensor response values into an evaluation space not dependent on the image-pickup light source by performing, for the sensor response values, operations which can be calorimetrically approximated from a plurality of different known spectral sensitivity characteristics of image-pickup means and spectral characteristics of a plurality of test light sources assumed in advance; projection conversion means for projecting the sensor response values into the evaluation space not dependent on the image-pickup light source using parameters stored in the storage means; and evaluation means for evaluating the correctness of a plurality of test light sources based on the image distribution state of sample values of an image scene projected by the projection conversion means.

Hence according to this invention, the following action is achieved.

With respect to a sampled sensor response, through operations which can be calorimetrically approximated from the known spectral sensitivity characteristics of the image-pickup system and from spectral characteristics of test light sources, projection into an evaluation space not dependent on the light source is performed, and the reasonableness of each of the test light sources is evaluated based on the states of sample values widely distributed therein.

Accordingly, it is necessary only to store, with respect to each test light source, a matrix or other parameters for projection from the sensor space into the evaluation space, so that by providing evaluation criteria in a single evaluation space, high estimation accuracy can be obtained with low memory consumption.

Further, a light source estimation method of this invention correctly estimates, for sensor response values, the image-pickup light source, by performing projection into an evaluation space not dependent on the image-pickup light source through operations which can be calorimetrically approximated from known spectral sensitivity characteristics of image-pickup means and from spectral characteristics of assumed test light sources, and by evaluating the correctness of a plurality of test light sources based on the state of distribution of sampled values of the projected scene.

Hence according to this invention, the following action is achieved.

In order to perform evaluations using a fixed space not dependent on the light source, it is sufficient to hold information, as comparison criteria for the correct light source, only for a single reference distribution space, so that evaluation processing is simplified, and consequently the problem of increasing costs can be resolved. As a further consequence, a greater amount of information (conditions and data) for referencing as criteria for the correct light source can be provided, so that optimization adjustment to improve estimation accuracy is also facilitated.

Further, an image-pickup apparatus of this invention includes: storage means for storing, for each test light source, parameters for projecting sensor response values into an evaluation space not dependent on the image-pickup light source by performing, for the sensor response values, operations which can be calorimetrically approximated from a plurality of different known spectral sensitivity characteristics of image-pickup means and spectral characteristics of a plurality of test light sources assumed in advance; projection conversion means for projecting sensor response values into the evaluation space not dependent on the image-pickup light source using parameters stored in the storage means; evaluation means for estimating the correct image-pickup light source by evaluating the correctness of a plurality of test light sources based on the image distribution state of sample values of an image scene projected by the projection conversion means; light source estimation means for estimating the final image-pickup light source to be determined as the estimated light source by conjoining in numerical formulas, or by selecting through conditional branching, or by combining both of an image-pickup light source determined by estimation and a light source determined by an estimation method different from the estimation method used; and color balance adjustment means which uses spectral characteristics or parameters appropriate thereto, as the color of the estimated image-pickup light source, in color balance processing of the sensor response of the image-pickup means.

Hence according to this invention, the following action is achieved.

In this image-pickup apparatus, the range of estimation of the image-pickup light source can be broadened, and by storing, for each test light source, only a matrix or other parameters for projection from the sensor space into the evaluation space and by providing evaluation criteria in a single evaluation space, high estimation accuracy with low memory consumption is obtained to be used in color balance processing.

Further, an image processing method of this invention performs projection, for sensor response values, into an evaluation space not dependent on the image-pickup light source through operations which can be calorimetrically approximated from known spectral sensitivity characteristics of image-pickup means and from spectral characteristics of assumed test light sources; estimates the correct image-pickup light source by evaluating the correctness of a plurality of test light sources based on the distribution state of sample values of the projected scene; estimates the final image-pickup light source to be determined as the estimated light source by conjoining in numerical formulas, by selecting through conditional branching, or by combining both of, an image-pickup light source determined by estimation and a light source determined by an estimation method different from the estimation method used; and uses the spectral characteristics or parameters appropriate thereto, as the color of the estimated image-pickup light source, in color balance processing of the sensor response of the image-pickup means.

Hence according to this invention, the following action is achieved.

In this image processing method, the range of estimation of the image-pickup light source can be broadened, and by storing, for each test light source, only a matrix or other parameters for projection from the sensor space to the evaluation space, and by providing evaluation criteria in a single evaluation space, high estimation accuracy with fast processing is obtained to be used in color balance processing.

BRIEF DESCRIPTION OF THE DRAWINGS

FIGS. 7A to 7C are diagrams showing test light sources, in which FIG. 7A is at equal intervals, FIG. 7B is finely divided at specific intervals, and FIG. 7C includes a plurality of light sources;

FIG. 9 is a diagram showing a reference distribution table; and,

BEST MODE FOR CARRYING OUT THE INVENTION

Figure 1:
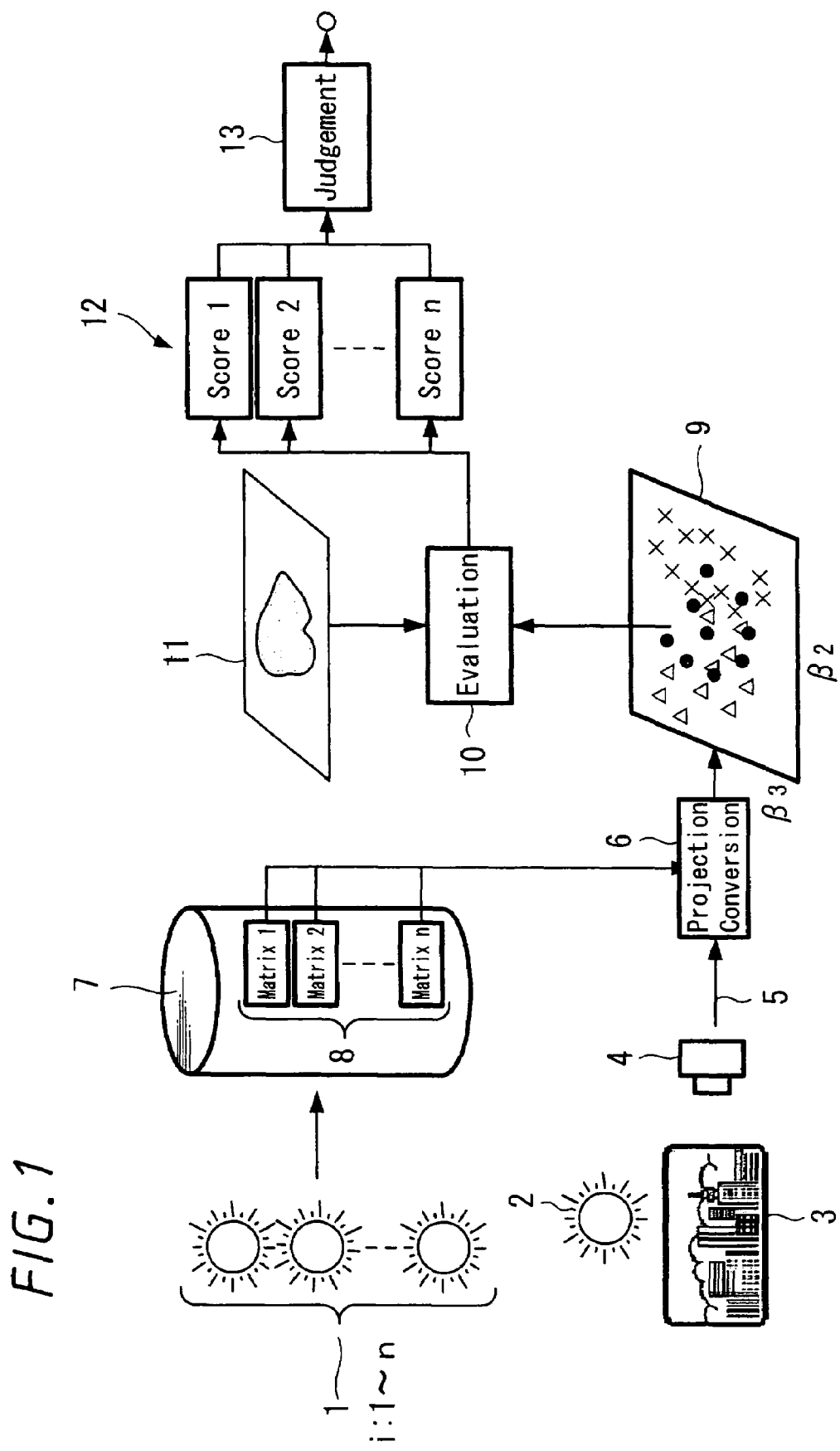
FIG. 1 is a conceptual diagram of a method of evaluating the reasonableness of test light sources in an evaluation space not dependent on the light source, which is applied to an embodiment of the present invention.

Hereinafter, embodiments of the present invention are explained, referring to the drawings as appropriate.

FIG. 1 is a conceptual diagram of the method, which is applied in this embodiment, of evaluating the reasonableness of test light sources in an evaluation space not dependent on the light source.

In FIG. 1, an image of an object 3 is picked up by image-pickup means 4 using an image-pickup light source 2. In order to enable projection into an evaluation space not dependent on the light source, with respect to a sensor response 5 sampled by the image-pickup means 4 at this time, calorimetric approximation operations are performed in advance using spectral sensitivity characteristic of the image-pickup means 4, which is a known quantity, and using spectral characteristics of test light sources (1 to n) 1, and a matrix (1 to n) 8 corresponding to each of the test light sources, which is stored in storage media 7, is used to perform projection into image distribution 9 of the evaluation space by means of a projection conversion portion 6; then based on the states of sample values distributed widely in the image distribution 9, an evaluation score value 12 is output by an evaluation portion 10 with respect to the reasonableness of each test light source (1 to n) 1 based on a reference distribution 11, and a judgment portion 13 then judges the test light source, which is judged to be most nearly correct based on the score values 12, to be the estimated light source O.

Accordingly, it is sufficient to store in the storage media 7 only a matrix (1 to n) 8 or other parameters for projection from the sensor space to the image distribution 9 in the evaluation space with respect to each of the test light sources (1 to n), so that by providing evaluation criteria through a single reference distribution 11 in the image distribution 9 in the evaluation space, scores (1, 2, . . . , n) 12 having a sufficient amount of information to enable accurate judgment by the judgment portion 13 can be output by the evaluation portion 10, with only a small amount of storage space of the storage media 7 used.

Figure 2:
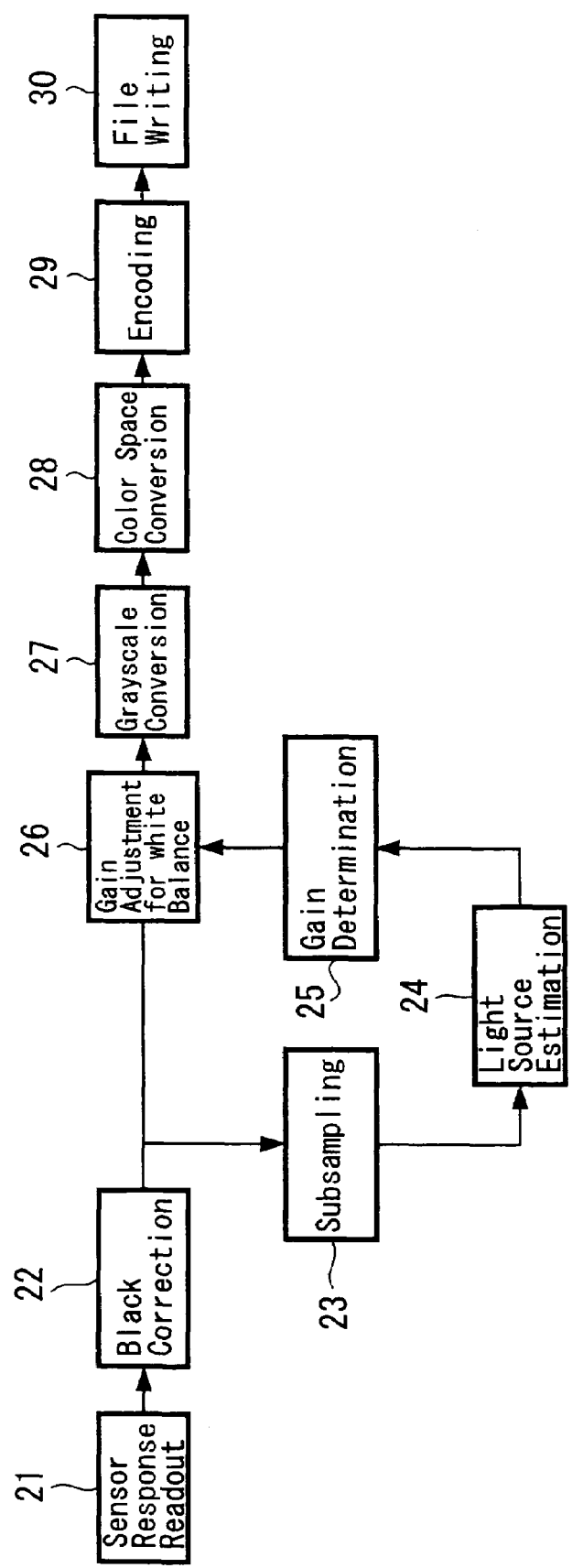
FIG. 2 is an image processing block diagram within a digital still camera.

FIG. 2 is a block diagram showing an image processing system within a digital still camera, to which an embodiment of this invention is applied.

A digital still camera is assumed, in which sensor response due to the spectral sensitivity characteristics, differing with respect to each pixel, in the three channels red, blue, green can be obtained as 10-bit digital values proportional to the quantity of light, and in the image processing operation unit within the apparatus, processing for white balance adjustment is performed using appropriate gain values for each channel.

In order to determine appropriate gain values for white balance adjustment based on sensor response obtained by subtracting offset components in a black correction portion 22 from values read by a sensor response readout portion 21, subsampling is performed at appropriate position intervals among all pixels by a subsampling portion 23. At this time, pixels which can be judged to have reached saturation in ranges near the minimum and maximum values of the sensor response, are excluded. Light source estimation processing described later on is performed by a light source estimation processing portion 24 on those sampled pixels.

As a result, a gain value corresponding to the estimated light source is selected from among the gain values for white balance adjustment for each test light source stored in a gain determination portion 25 through the calculations indicated previously in equations (1) and (2); and the selected gain value is employed in white balance processing in a white balance gain adjustment portion 26.

Subsequently, through nonlinear grayscale conversion by a grayscale conversion portion 27 and 3×3 matrix conversion by a color space conversion portion 28, Y, Cb and Cr (luminance/color-difference signals) are converted into 8 bits each, encoding by an encoding portion 29 which includes image compression processing is performed, and the result is written by a file writing portion 30 as an electronic file in a memory card.

In light source estimation in this embodiment, an object surface linear reflection model is assumed as indicated by the following equation (3) with respect to the sensor response.

$$f = \begin{bmatrix} R \\ G \\ B \end{bmatrix} = SLr \quad (3)$$

where L is the diagonal matrix (n×n) containing n wavelength samples of light source spectral distributions, and r is the column vector (number of wavelength samples n) indicating the object surface spectral reflectivity.

This embodiment is explained using the matrix calculation of equation (4), which assumes that the spectral reflectivity of the object surface can be approximated by a linear combination of three basis functions.

$$r \cong r_a = B_w = [b_1 \ b_2 \ b_3] \begin{bmatrix} \beta_1 \\ \beta_2 \\ \beta_3 \end{bmatrix} \quad (4)$$

where B is a matrix indicating the basis functions of the spectral reflectivity (number of wavelength samples n×basis number 3), $b_1$, $b_2$, $b_3$ are column vectors indicating the basis functions of the spectral reflectivity (number of wavelength samples n), w is a column vector containing weighting coefficients (basis number 3), $\beta_1$, $\beta_2$, $\beta_3$ are weighting coefficients used to indicate the spectral reflectivity as linear sums of the basis functions, and $r_a$ is a column vector (number of wavelength samples n) indicating approximate values of the spectral reflectivity.

If the spectral reflectivity is known, approximate values for weighting coefficients of the basis functions can be calculated as in the following equation (5).

$$w = \begin{bmatrix} \beta_1 \\ \beta_2 \\ \beta_3 \end{bmatrix} = B^t(BB^t)^{-1}r \quad (5)$$

Figure 5:
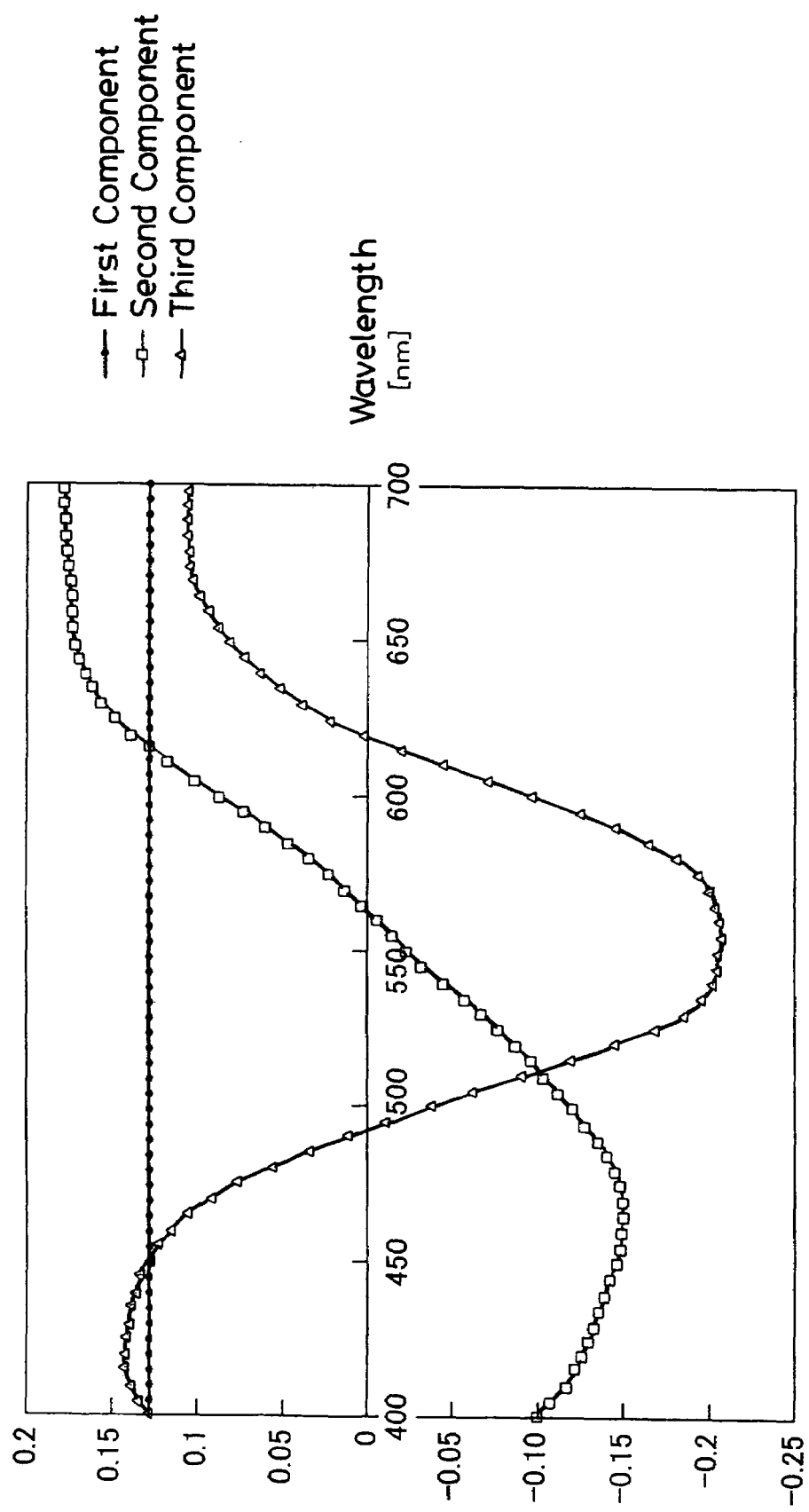
FIG. 5 is a diagram showing a spectral reflectivity basis function.

Because in equation (5) w does not depend on the sensor or the image-pickup light source, the vector space resulting from the weighting coefficients of basis functions (hereafter called the reflectivity vector space) can be said to be a space specific to the object. The spectral reflectivity basis functions shown in FIG. 5 are examples of basis functions shown in the wavelength range from 400 nm to 700 nm; because β1 represents the brightness component, the first component is set to be flat over the wavelength range, whereas the second and third components are the results of extracting the highest two components excluding the first component as an offset from the spectral reflectivity data for 24 specific color charts, and then performing principal component analysis. From equations (3) and (4), when the basis number and the number of sensor response channels are the same, the column vector projected from the sensor response by the matrix is calculated using the following equation (6).

$$\tilde{w} = \begin{bmatrix} \tilde{\beta}_1 \\ \tilde{\beta}_2 \\ \tilde{\beta}_3 \end{bmatrix} = (SLB)^{-1} \begin{bmatrix} R \\ G \\ B \end{bmatrix} = M \begin{bmatrix} R \\ G \\ B \end{bmatrix} \quad (6)$$

The matrix M in equation (6) projects the sensor response into reflectivity vector space, but is a matrix which depends on the light source L, and is called hereinafter the light source matrix. If the same light source as that for the scene for which the sensor response was obtained is used as the light source L, the column vector $\tilde{w}$ projected from the sensor response is restored to a close value even if the spectral reflectivity of the object is unknown. However, if a light source different from that for the image-pickup scene is used, this restoration accuracy is not obtained. Hence an arbitrary light source Li is assumed, and the light source matrix $M_i$ indicated in equation (7) is used.

$$M_i = (SL_iB)^{-1} \quad (7)$$

Figure 6:
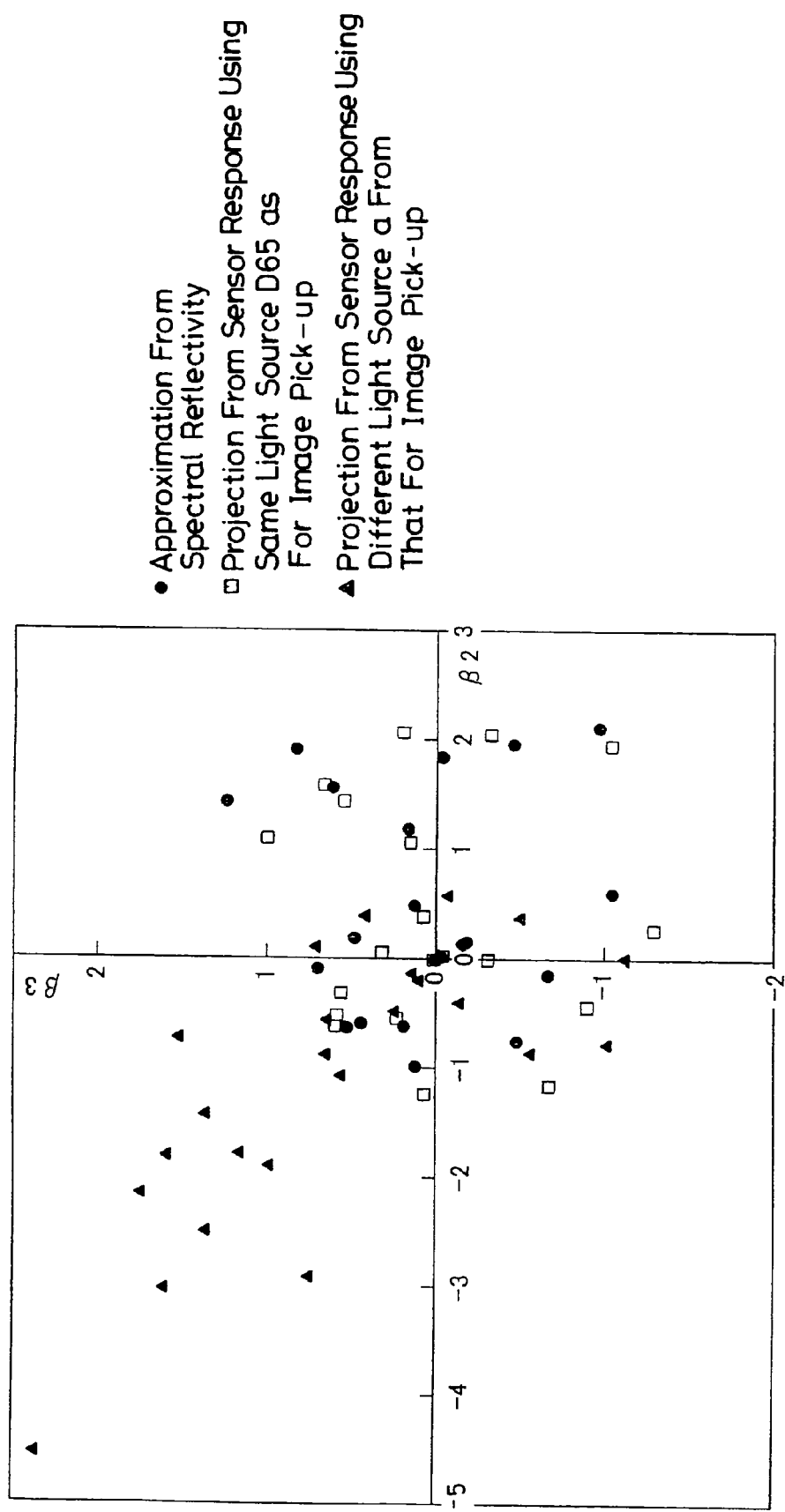
FIG. 6 is a diagram showing an example of projecting a color chart into a reflectivity vector space.

Using the light source matrix $M_i$ obtained using equation (7), and utilizing the relation between the column vector $\tilde{w}_i$ projected as equation (6) and the correct column vector w for the object, the degree of similarity with the image-pickup light source in the reflectivity vector space can be evaluated. FIG. 6 shows, by simulation results for 24 color charts in the $\beta_2$-$\beta_3$ plane in the reflectivity vector space, that the distribution of points approximated from the spectral reflectivity of a known surface is in a state close to the distribution of points projected using the light source matrix for the same light source as that at the time of image pick up from the sensor response for a pickup image of the same surface, and that the distribution of points projected using a light source matrix for a light source different from that at the time of image pickup is in a state different from the former distribution.

The column vectors w which can be adopted by the object are widely distributed in reflectivity vector space, and it is difficult to evaluate the relation with an unknown object by using the column vector $\tilde{w}_i$ obtained from the sensor response for a single pixel. Hence here it is assumed that the image-pickup scene is illuminated uniformly by a single light source, the sensor response for sampled pixels among all pixels is projected into the reflectivity vector space, and by evaluating these distribution states (hereafter called the image distribution), a single estimated light source is determined. A plurality of light sources for evaluation (hereafter called test light sources) are provided, and all light source matrixes are calculated and stored in advance according to the above equation (7).

Figure 7A:
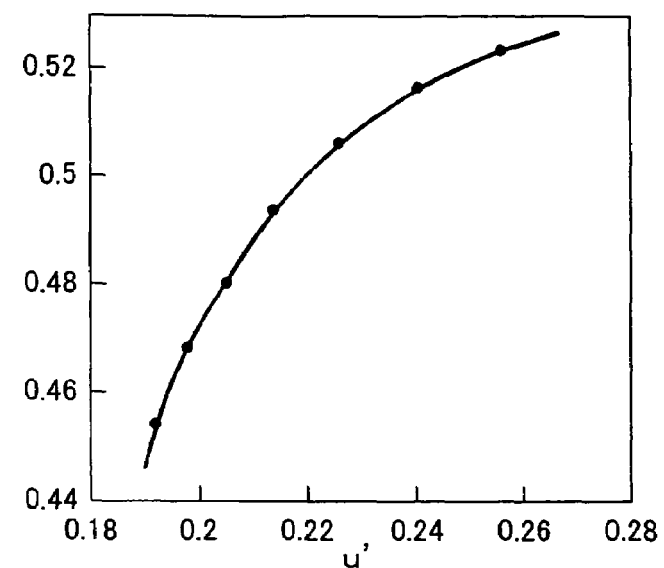
Figure 7B:
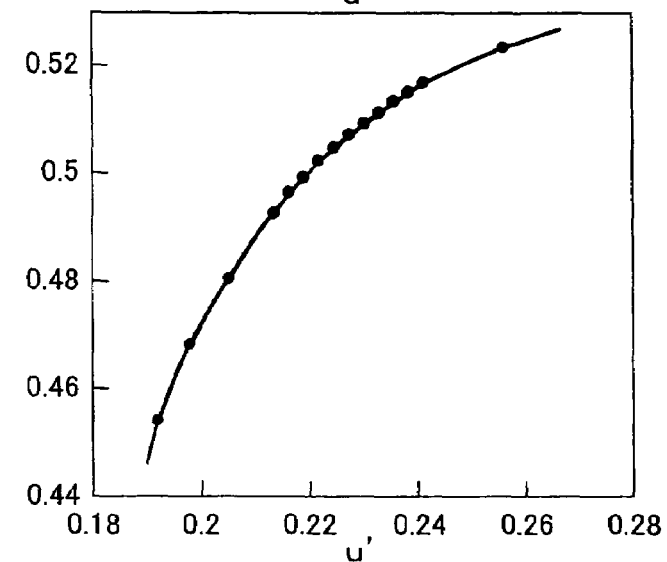
Figure 7C:
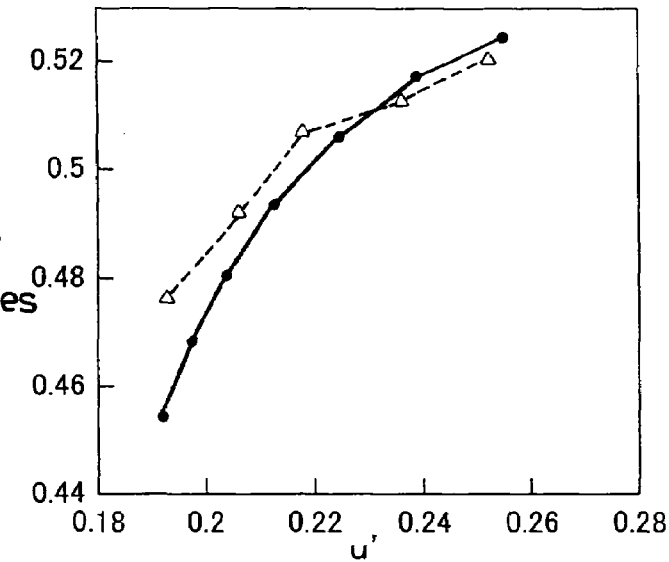

At the time of estimation processing, each light source matrix is employed with respect to all test light sources to evaluate the projected image distribution, and the test light source with the highest evaluation index indicating the degree of correctness is selected as the estimated light source among all the test light sources. Here, natural light with color temperatures in the range approximately 2850K to 8000K are assumed as test light sources; in order to reduce estimation error scattering, seven test light sources were adopted on the CIE daylight locus in the u'-v' plane of the CIE 1976 UCS chromaticity diagram at intervals as nearly equal as possible, as shown in FIG. 7A. In this embodiment, any of the test light sources can be selected as the estimation result, so that as shown in FIG. 7B, the test light sources are more finely divided only in specific intended intervals in the color temperature direction on the u'-v' plane; and as shown in FIG. 7C, light sources employing physically different light emission methods, such as fluorescent lamps, may also be added to raise the probability of obtaining the correct estimation result in more diverse scenes.

In order to evaluate in relative terms whether the distribution state of an image distribution is the correct state for an object, a single fixed distribution state (hereinafter called the reference distribution) to be taken as the criterion for comparison in reflectivity vector space is referenced. The reference distribution is stored as data in the format of a two-dimensional numerical table provided with weighting coefficients with respect to each cell divided at equal intervals in the $\beta_2$-$\beta_3$ plane. This reference distribution is generated using, for example, a procedure such as follows.

Figure 3:
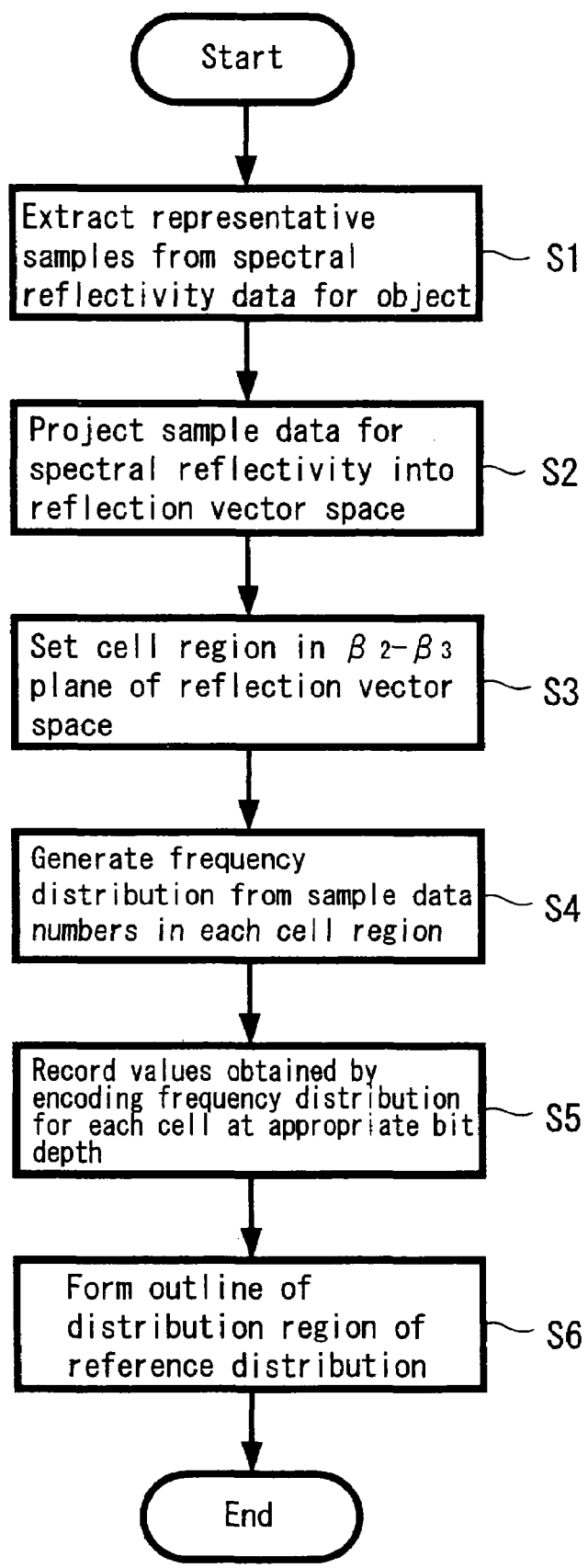
FIG. 3 is a flowchart showing reference distribution generation processing.

Specific reference distribution generation processing is shown in the flowchart of FIG. 3.

In step S1, spectral reflectivity data for the surfaces of numerous objects which might be objects for image pickup is collected, and representative samples which are as diverse as possible are extracted.

Figure 8:
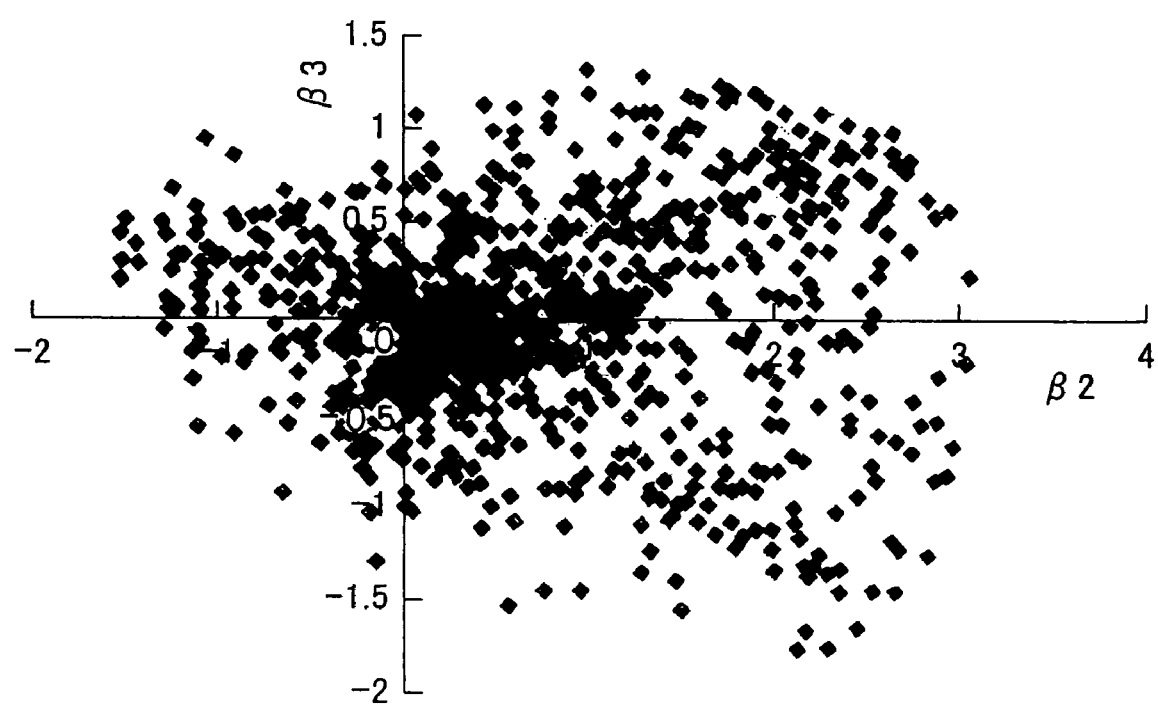
FIG. 8 is a diagram showing a distribution of reflectivity samples.
Figure 10:
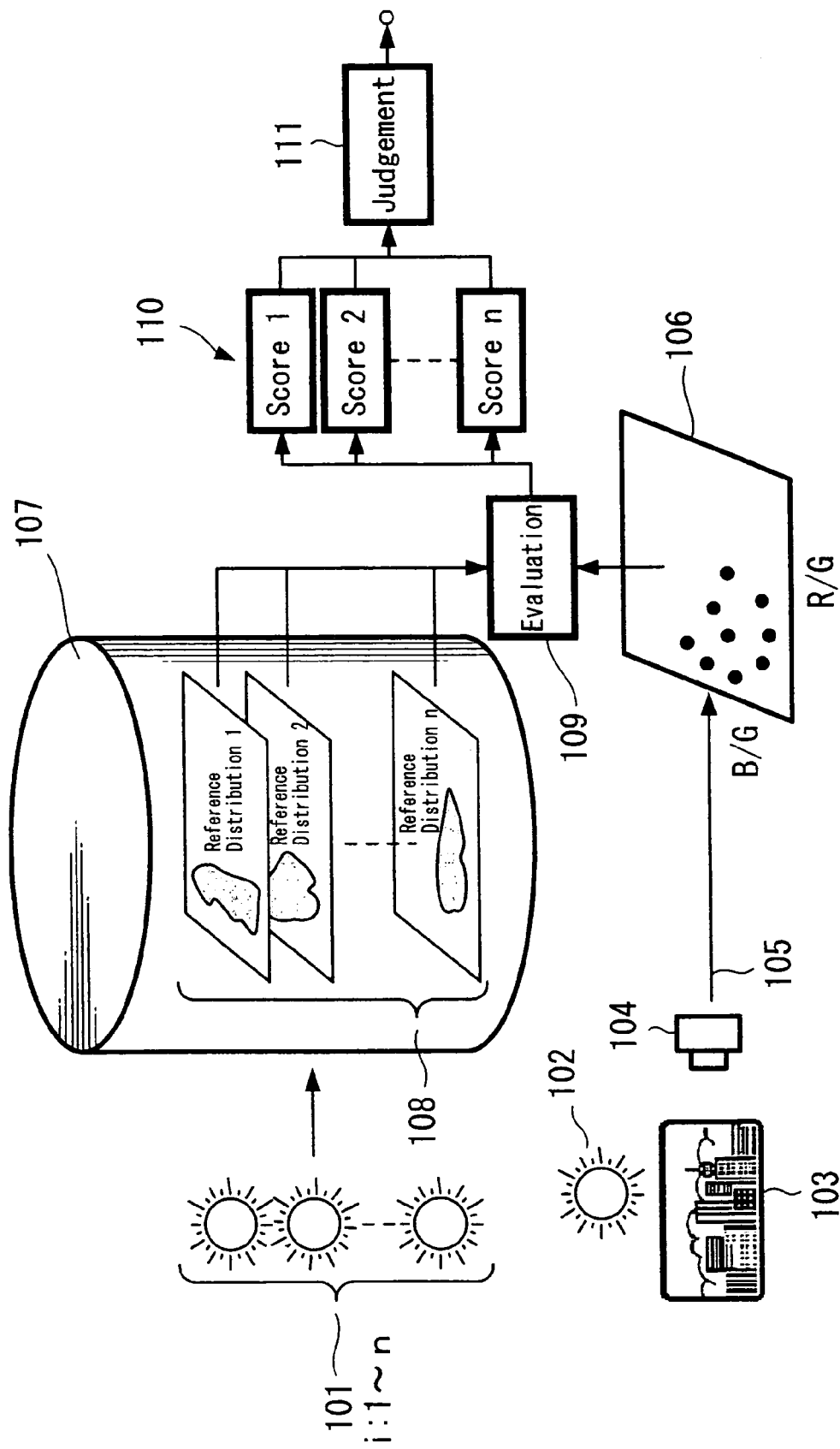
FIG. 10 is a conceptual diagram of a conventional method of evaluating the reasonableness of test light sources in sensor response space.

In step S2, sample data for spectral reflectivity is projected into reflectivity vector space using equation (5) (FIG. 8).

In step S3, the cell region is set by specifying lower ends $low_2$ and $low_3$, upper ends $high_2$ and $high_3$, and cell division numbers $bin_2$ and $bin_3$ for each axis of the $\beta_2$-$\beta_3$ plane in reflectivity vector space, such that the rectangular region comprehends the sample distribution.

In step S4, the numbers of data samples positioned in each cell region are counted to generate a frequency distribution.

Cell coordinates (x, y) are calculated using the following equation (8).

$$x = \text{floor}((\beta_2 - low_2) \times bin_2 / (high_2 - low_2))$$

$$y = \text{floor}((\beta_3 - low_3) \times bin_3 / (high_3 - low_3)) \quad (8)$$

where floor ( ) is an operator which discards the decimal fraction.

In step S5, values $Tr_{xy}$ which encode frequencies in each cell to an appropriate bit depth are recorded.

Figure 9:
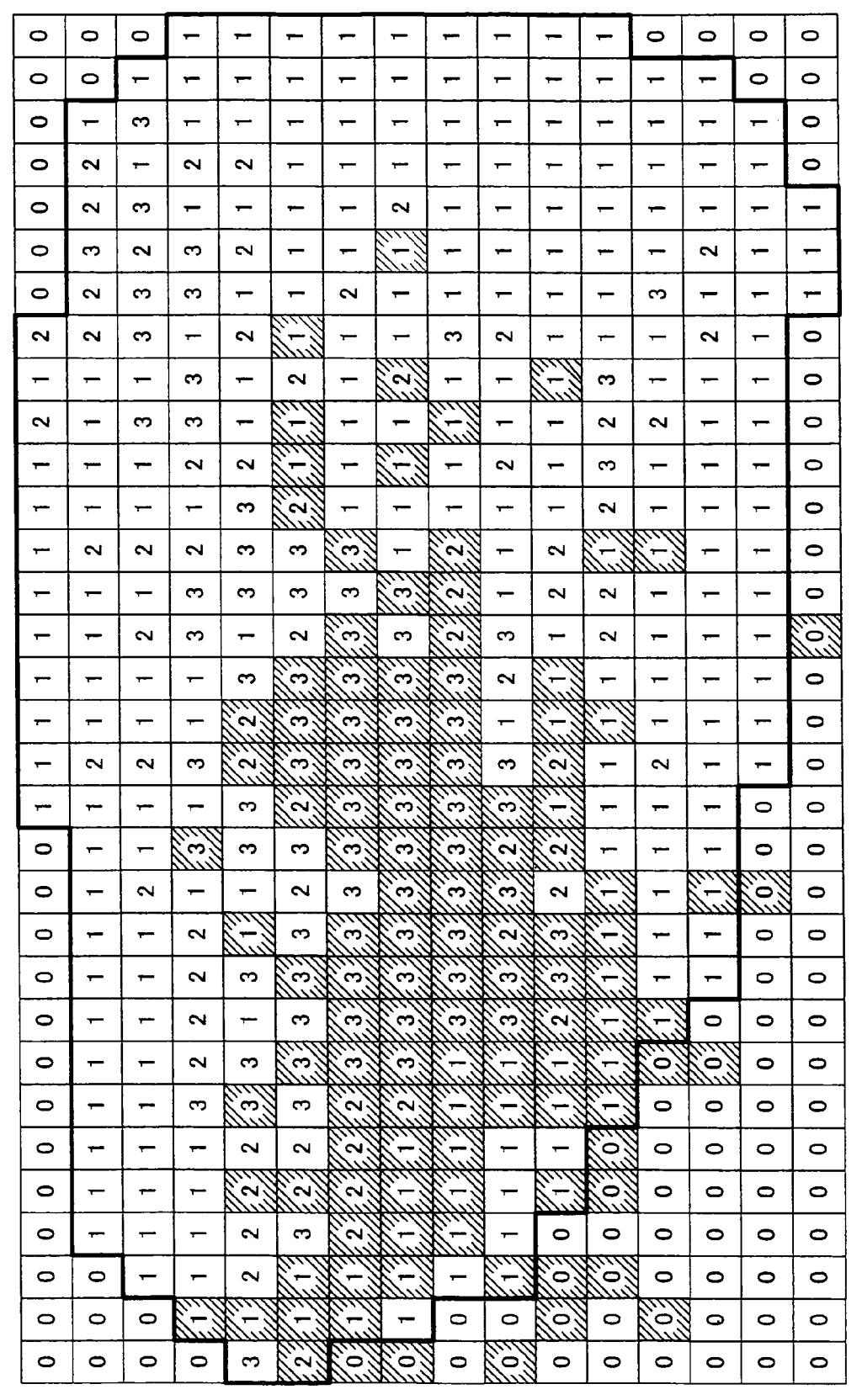

In step S6, in order to form the outline of the distribution range of the reference distribution, the polygon which convexly encompasses the cells in which values exist, is calculated, and by assigning a value of 1 to any cells existing within the polygon for which a value does not exist, holes in cells within the outline are filled. FIG. 9 shows numerical values in cells in an example of a reference distribution generated with a bit depth of 2.

Figure 4:
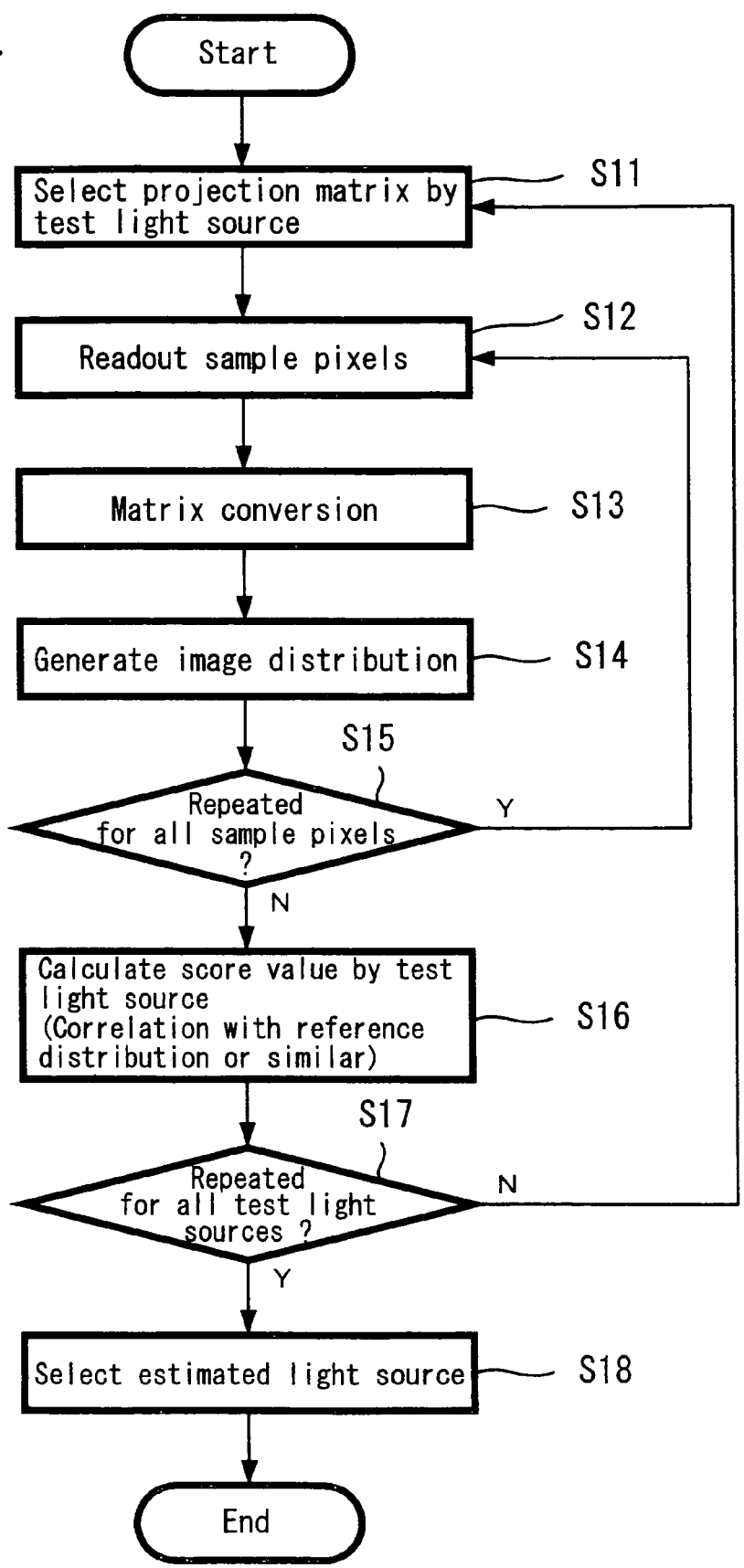
FIG. 4 is a flowchart showing light source estimation processing.

FIG. 4 is a flowchart of specific light source estimation processing.

At the time of estimation processing, calculation of score values with respect to each test light source is repeated according to the following procedure shown in FIG. 4.

In step S11, a projection matrix is selected for a test light source. Specifically, the projection conversion portion 6 shown in FIG. 1 selects a light source matrix $M_i$ for a test light source i from the storage media 7.

In step S12, reading of sample pixels is performed. Specifically, the projection conversion portion 6 shown in FIG. 1 reads sample pixels from the image-pickup means 4. Here, the sensor response 5 of sample pixels is the image-pickup result for various scenes.

In step S13, matrix conversion is performed. Specifically, the projection conversion portion 6 shown in FIG. 1 uses the light source matrix $M_i$ for the test light source i to project the sensor response 5 for sample pixels into the reflectivity vector space.

In step S14, the image distribution is generated. Specifically, the projection conversion portion 6 shown in FIG. 1 creates an image distribution 9 in the same cell positions as the reference distribution 11. Similarly to generation of the reference distribution 11, the image distribution 9 includes values $Th_{ixy}$ which encode the frequency in each cell to an appropriate bit depth. Here the bit depth is taken to be 1; an example of an image distribution in which a value of 1 is assigned to each cell in which one or more pixel exists, and 0 is used for all other cells, is shown in gray within the cells of the reference distribution table in FIG. 9.

In step S15, processing is repeated for all sample pixels, returning to step S12 to repeat the processing and judgment of steps S12 through S15. Specifically, the projection conversion portion 6 of FIG. 1 not only records the image distribution 9 for each pixel, but also counts pixels positioned in cells (shown as the bold border in FIG. 9) for which values exist in the reference distribution 11.

In step S16, score values are calculated with respect to each test light source. Here, a score value 12 is a correlation value or similar between the image distribution 9 and the reference distribution 11. Specifically, the evaluation portion 10 shown in FIG. 1 calculates the following three types of indexes.

First, as the distribution correlation, equation (9) is used to calculate the sum of the product of the image distribution 9 with weightings of the reference distribution 11 for each cell, as an index representing the correlation function between the reference distribution 11 and the image distribution 9.

$$Ic_i = \sum_{x=1}^{bin2} \sum_{y=1}^{bin3} Tr_{xy} Th_{ixy} \quad (9)$$

Second, as the division of the number of pixels, equation (10) is used to calculate the fraction of the number of pixels among all sample pixels existing in the color gamut (shown as the bold border in FIG. 9) of the reference distribution 11, as a comparative index relative to the reference distribution 11 with respect to the number of pixel samples.

$Ip_i$=(number of pixels positioned at cell coordinates x,y for which $Tr_{ixy}$>0)/(total number of sample pixels)    (10)

Third, as the distribution size, equation (11) is used to calculate the following index, only with respect to the image distribution in reflectivity vector space, based on the assumption that in a case of projection using an erroneous light source matrix, the larger the difference with the correct light source matrix, the broader will be the distribution range dispersed in the $\beta_2$ axis direction.

$Ir_i$=(Max$2_m$−Min$2_m$)/(Max$2_i$−Min$2_i$)    (11)

where Max$2_i$ is the maximum value of $\beta_2$ projected by the light source matrix of the test light source i, Min$2_i$ is the minimum value of $\beta_2$ projected by the light source matrix of the test light source i, and m is the light source i among all test light sources for which Max$2_i$−Min$2_i$ is smallest.

Here, the evaluation portion 10 shown in FIG. 1 uses equation (12) to obtain score values 12 for light sources i by multiplying the three types of index.

$S_i = Ic_i \cdot Ip_i \cdot Ir_i$    (12)

In step S17, processing is repeated with respect to all test light sources by returning to step S11 to repeat the processing and judgment of steps S11 through S17.

In step S18, the estimated light source is selected. Specifically, the evaluation portion 10 shown in FIG. 1 determines as the estimated light source the light source i having the highest score value 12 upon obtaining score values 12 for all test light sources 1.

In addition, an intermediate light source, selected through weighted averaging process etc. using test light sources with high score values, may also be determined to be the estimated light source.

In addition, only a specific interval close to test light sources with high score values on the u'-v' plane in FIG. 7A may be more finely divided in the color temperature direction to newly generate a plurality of test light sources, and score calculation and decisions thereof are performed in stages with respect to the newly generated test light sources to further improve the resolution of the estimation result.

When test light sources include a plurality of light sources which can be classified in different categories on the basis of the physical method of light emission, such as for example high-efficiency fluorescent lamps or three-wavelength fluorescent lamps, different indexes between evaluations within each category and evaluations among categories, are used in respective calculations, and score values separately obtained may be combined to judge the estimated light source.

When scene light source estimation processing is performed continuously over a period of time, indexes and estimation results obtained in the past at short intervals may be combined to judge the most recent estimated light source.

In order to evaluate the correctness of a test light source in reflectivity vector space, in addition to the distribution state in the $\beta_2$-$\beta_3$ plane, distributions in other two-dimensional spaces such as the $\beta_1$-$\beta_3$ and $\beta_1$-$\beta_2$ planes may be evaluated, or evaluations of one-dimensional distributions along each axis may be performed, or the distribution state in three dimensions may be evaluated.

For example, by using a two-dimensional space based on relative values among vector channels, such as for example the $\beta_2/\beta_1$-$\beta_3/\beta_1$ plane resulting from division of both $\beta_2$ and $\beta_3$ by $\beta_1$, the effects of scattering in exposure for each scene and unevenness in the lighting intensity within the same scene on evaluations can be suppressed.

Further, sensor response values, which are the results of image pickup of various scenes actually existing or the results of prediction by numerical operations of image pickup of diverse virtual scenes, can be projected into evaluation spaces for separate scenes through operations which can be calorimetrically approximated from the spectral sensitivity characteristics of the image-pickup means and the spectral distribution characteristics of the image-pickup light source measured at the time of image pickup of each scene, and weighting distribution and region information generated from the frequency distribution of the projection values may be used as a reference color gamut.

Needless to say, this invention is not limited to the above-described embodiment, but can adopt various other configurations as appropriate within the scope of the claims of this invention.

A light source estimation apparatus of this invention estimates the correct image-pickup light source by including: storage means for storing, for each test light source, parameters for projecting sensor response values into an evaluation space not dependent on the image-pickup light source by performing, for the sensor response values, operations which can be calorimetrically approximated from a plurality of different known spectral sensitivity characteristics of the image-pickup means and the spectral characteristics of a plurality of test light sources assumed in advance; projection conversion means for projecting sensor response values into the evaluation space not dependent on the image-pickup light source using parameters stored in the storage means; and evaluation means for evaluating the correctness of a plurality of test light sources based on the image distribution state of sample values of an image scene projected by the projection conversion means. Hence by projecting sampled sensor responses into an evaluation space not dependent on the light source through operations which can be calorimetrically approximated from the spectral sensitivity characteristics of the image-pickup system, which are known, and from the spectral characteristics of the test light source, there is the advantageous result that the reasonableness of each test light source can be evaluated based on the state of sample values widely distributed therein.

Accordingly, it is sufficient to store with respect to each test light source only a matrix or other parameters necessary for projection from the sensor space into the evaluation space, so that by providing evaluation criteria in a single evaluation space, high estimation accuracy can be obtained with low memory consumption.

Further, a light source estimation method of this invention correctly estimates the image-pickup light source by performing projection of sensor response values into an evaluation space not dependent on the image-pickup light source through operations which can be calorimetrically approximated from spectral sensitivity characteristics of the image-pickup means which are known and from the spectral characteristics of the assumed test light source, and by evaluating the correctness of a plurality of test light sources based on the state of distribution of sampled values of the projected scene. Hence evaluation is performed using a fixed space not dependent on the light source, so that it is sufficient to store information for only one reference distribution space as the comparison criterion for the correct light source, and evaluation processing is simplified, so that the problem of cost increases can be resolved. Further, a greater amount of information (conditions and data) for referencing as criteria for the correct light source can be provided, and so there is the advantageous result that optimization adjustment to improve estimation accuracy is also facilitated.

In the method according to this invention, the most appropriate light source is judged from among a plurality of test light sources; in methods proposed in the prior art, an evaluation criterion is necessary for each light source in order to perform evaluations in a space which depends on the light source, and because the amount of data used as evaluation criteria increases in proportion to the number of patterns of the test light sources, either the amount of data of evaluation criteria or the number of test light sources must be reduced, so estimation accuracy is sacrificed, or accuracy is given priority, resulting in increased memory costs. In this invention, coefficients for space conversion are provided which require only a small amount of memory for each test light source, and evaluations are performed using a fixed space not dependent on the light source, so that it is sufficient to store with respect to only a single space the information (conditions and data) to be referenced as comparison criteria for judging the correct light source, and consequently the estimation accuracy can be improved without increases in cost, affording advantages over the techniques of the prior art.

Further, an image-pickup apparatus of this invention includes: storage means for storing, for each test light source, parameters for projecting sensor response values into an evaluation space not dependent on the image-pickup light source by performing operations which can be calorimetrically approximated, for the sensor response values, from a plurality of different known spectral sensitivity characteristics of the image-pickup means and the spectral characteristics of a plurality of test light sources assumed in advance; projection conversion means for projecting sensor response values into the evaluation space not dependent on the image-pickup light source using parameters stored in the storage means; evaluation means for estimating the correct image-pickup light source by evaluating the correctness of a plurality of test light sources based on the image distribution state of sample values of an image scene projected by the projection conversion means; light source estimation means for estimating the final image-pickup light source to be determined as the estimated light source by conjoining in numerical formulas, or by selecting through conditional branching, or by combining both of, an image-pickup light source determined by estimation and a light source determined by an estimation method different from the estimation method used; and color balance adjustment means for using spectral characteristics, which are the color of the estimated image-pickup light source, or parameters appropriate thereto in color balance processing of the sensor response of the image-pickup means. Hence in the image-pickup apparatus, the range of estimation of the image-pickup light source can be broadened, and it is only necessary to store a matrix or other parameters for each test light source for projection from sensor space into evaluation space, and so there is the advantageous result that by providing evaluation criteria in a single evaluation space, high estimation accuracy can be obtained with low memory consumption, enabling use in color balance processing.

Further, an image processing method of this invention performs projection, for sensor response values, into an evaluation space not dependent on the image-pickup light source through operations which can be calorimetrically approximated from known spectral sensitivity characteristics of the image-pickup means and from the spectral characteristics of the assumed test light source; estimates the correct image-pickup light source by evaluating the correctness of a plurality of test light sources based on the distribution state of sample values of the projected scene; estimates the final image-pickup light source to be determined as the estimated light source by conjoining in numerical formulas, or by selecting through conditional branching, or by combining both of, an image-pickup light source determined by estimation and a light source determined by an estimation method different from the estimation method used; and uses the spectral characteristics, which are the color of the estimated image-pickup light source, or parameters appropriate thereto in color balance processing of the sensor response of the image-pickup means. Hence in the image processing method, the range of estimation of the image-pickup light source can be broadened, and it is only necessary to store a matrix or other parameters for each test light source for projection from sensor space into evaluation space, and so there is the advantageous result that by providing evaluation criteria in a single evaluation space, high estimation accuracy can be obtained with low memory consumption, enabling use in color balance processing.

This invention can provide one framework for accurately estimating the light source of an image-pickup scene from the response of the image-pickup system. If the light source of an unknown scene can be estimated in the image-pickup system, it becomes possible to accurately determine the image white balance adjustment, color matching adjustment and other parameters in the image-pickup equipment, and accurate color reproduction of the picked up image of a scene, and accurate correction so as to obtain a specific intended color reproduction, can be performed when recording and displaying images.

The invention claimed is:

1. A light source estimation apparatus to correctly estimate the image-pickup light source, in which from sensor response values obtained upon pickup of an image of an unspecified arbitrary object, image-pickup means having a plurality of different spectral sensitivity characteristics estimates spectral characteristics indicating color of an unknown image-pickup light source irradiating an object, comprising:

storage means for storing, for each test light source, parameters for projecting said sensor response values into an evaluation space not dependent on said image-pickup light source by performing operations which can be colorimetrically approximated from a plurality of different said known spectral sensitivity characteristics of said image-pickup means and from the spectral characteristics of a plurality of test light sources assumed in advance;

projection conversion means for projecting said sensor response values into said evaluation space not dependent on the image-pickup light source using parameters stored in said storage means; and, evaluation means for evaluating the correctness of said plurality of test light sources based on the image distribution state of sample values of an image scene projected by said projection conversion means.

2. A light source estimation method in which from sensor response values obtained upon pickup of an image of an unspecified arbitrary object, image-pickup means having a plurality of different spectral sensitivity characteristics estimates spectral characteristics indicating color of an unknown image-pickup light source irradiating an object, comprising the steps of:

projecting said sensor response values into an evaluation space not dependent on the image-pickup light source through operations which can be calorimetrically approximated from known spectral sensitivity characteristics of image-pickup means and from spectral characteristics of an assumed test light source; and estimating the correct image-pickup light source by evaluating the correctness of a plurality of said test light sources based on a state of distribution of sampled values of the projected scene.

3. The light source estimation method according to claim 2, wherein a vector space for said evaluation is a space in which weighting coefficients used to approximate the spectral reflectivity of diverse object surfaces by conjoining a plurality of reflectivity basis functions, represent the spectral reflectivity characteristics specific to an object surface, or a space in which the weighting coefficients become further converted values through fixed operations.

4. The light source estimation method according to claim 3, wherein said reflectivity basis functions to approximate the spectral reflectivity are spectral reflectivity components obtained by statistical analysis of the spectral reflectivity data of a plurality of known object surfaces as a population; are intentionally extracted spectral reflectivity components; or are a combination of both.

5. The light source estimation method according to claim 2, wherein a vector space for said evaluation is a space in which spectral distribution values for light reflected on an object surface from a single virtual reference light source having a specific spectral distribution are converted into a plurality of channels by fixed operations.

6. The light source estimation method according to claim 5, wherein a reference light source, said spectral distribution of which is fixed over a wavelength range, is used.

7. The light source estimation method according to claim 2, wherein a plurality of light sources with different known spectral distributions are taken to be said test light sources; spectral distribution data for each test light source or coefficients for computation corresponding to each test light source to which said spectral distribution data is applied are stored in advance; and the data or coefficients are referenced at the time of said light source estimation.

8. The light source estimation method according to claim 2, wherein a plurality of different representative light sources are extracted and stored in advance as said test light sources from among spectral distribution data for various known light sources, from among coefficients to approximate the spectral distribution data by weighted linear sums of a plurality of light source basis functions, or from among indexes obtained using fixed computation formula from the spectral distribution data; and the spectral distribution data of each of the test light sources, or the computation coefficients corresponding to each of the test light sources to which the data is applied, are referenced at the time of said light source estimation.

9. The light source estimation method according to claim 8, wherein, as the information for the plurality of different light sources stored in advance, spectral distribution data for a specific light source or computation coefficients corresponding to a specific light source to which the distribution data is applied are used; and said plurality of test light sources are generated and referenced by appropriate selection, interpolation processing, or the like at the time of said light source estimation.

10. The light source estimation method according to claim 7, wherein said plurality of representative test light sources are categorizable by the color temperature value of the light source, by the physical light emission method of the light source, or by both.

11. The light source estimation method according to claim 2, wherein, among the sensor response values of said image-pickup means, values with respect to all pixels or values with respect to pixels sampled at appropriate positions, in appropriate ranges, and at appropriate intervals within the spatial position of the image-pickup plane are used.

12. The light source estimation method according to claim 2, wherein, among the sensor response values of said image-pickup means, values with respect to only pixels the values for each channel of which are in a specified range, or values with respect to all pixels other than pixels the values for each channel of which are in a specified range are used.

13. The light source estimation method according to claim 2, wherein, at the time of projecting sensor response values of said image-pickup means into evaluation space, or prior to said time, scaling is performed at a fixed arbitrary ratio or at an appropriate ratio determined in advance according to image-pickup results.

14. The light source estimation method according to claim 2, wherein sensor response values of said image-pickup means are used after adding noise, exposure error, or other temporally fluctuating quantities supposed in said image-pickup means, or after adding pixels to which such fluctuating quantities have been added.

15. The light source estimation method according to claim 2, wherein with respect to each of said test light sources, a statistical quantity obtained from values of sample pixels projected into evaluation space; a statistical quantity obtained from an image distribution indicating the frequency distribution in evaluation space generated from sample pixels; a statistical quantity obtained from the image color gamut indicating the region in the evaluation space in which sample pixels are distributed; or a combination of any two or more of these, are used, either without further modification, or after conversion into values by a fixed operation, as said estimation criterion for an index of correctness assumed in advance.

16. The light source estimation method according to claim 2, wherein a statistical quantity obtained from sample pixels in sensor space of said sensor response values, or a statistical quantity obtained from values converted by a fixed operation from sample pixel values in sensor space, are projected into evaluation space with respect to each of said test light sources, and are used, either without further modification, or after conversion into values by a fixed operation, as said estimation criterion for an index of correctness assumed in advance.

17. The light source estimation method according to claim 15, wherein, with respect to the spectral reflectivity of an object surface, an index of the correctness of each of said test light sources is calculated in advance using statistical quantities added constraints or weighting formable in a specific region of the evaluation space, based on the physical possibility in the range from 0 to 1 at each wavelength and on an assumed probabilistic distribution in the real world in which, on average, there exist numerous surface approximating achromaticity with a flat wavelength characteristic.

18. The light source estimation method according to claim 2, wherein, with respect to each of said test light sources, a correlation function of a reference color gamut recorded in advance, referenceable, and indicating the range of appearance in the evaluation space; with sample pixel values projected into the evaluation space; with the frequency distribution in the evaluation space generated from the sample pixels; with the region in the evaluation space in which sample pixels are distributed; or with a combination of any two or more of same, is used as an index of said estimation criterion.

19. The light source estimation method according to claim 18, wherein a weighting distribution and region information generated from the frequency distribution in the evaluation space of values converted from spectral reflectivity data of various object surfaces into coefficients approximated by reflectivity basis functions, or of values obtained by converting said coefficients by a fixed operation, are used as said reference color gamut.

20. The light source estimation method according to claim 18, wherein a weighting distribution and region information generated from the frequency distribution of values, in which sensor response values which are either the result of image pickup of a variety of actually existing scenes or the result of predicting by numerical operations the images picked up for a variety of virtual scenes are projected into evaluation space for each scene using operations capable of calorimetrically approximating from spectral sensitivity characteristics of said image-pickup means and from spectral distribution characteristics of the image-pickup light source measured at the time of image pickup of each scene, are used as said reference color gamut.

21. The light source estimation method according to claim 18, wherein, with respect to spectral reflectivity of an object surface, a weighting distribution and region information generated from a frequency distribution determined based on a physical possibility in the range 0 to 1 at each wavelength and on an assumed probabilistic distribution in the real world in which, on average, there exist numerous surface approximating a chromaticity with a flat wavelength characteristic, are used as said reference color gamut.

22. The light source estimation method according to claim 19, wherein, before or after generating said reference color gamut from any of said frequency distributions or from a combination thereof, with respect to the distribution in evaluation space, interpolation, extrapolation, removal, spatial filtering, or other processing according to fixed criteria are performed.

23. The light source estimation method according to claim 15, wherein, in generation of an index of correctness for each of said test light sources, in order to emphasize the high color saturation region in which the difference between test light sources appears more prominently in the evaluation space, the image distribution is extracted and weighted operations are performed on the outline or in the vicinity thereof in the image color gamut.

24. The light source estimation method according to claim 15, wherein, with respect to the image distribution or image region of sample pixels projected into the evaluation space, after performing interpolation, extrapolation, removal, spatial filtering, or other processing according to fixed criteria, an index of correctness is calculated for each of said test light sources.

25. The light source estimation method according to claim 15, wherein a plurality of different indexes generated from sample pixel values projected into a single evaluation space, or a plurality of different indexes generated from sample pixel values projected into a plurality of different evaluation spaces, are conjoined by numeric means; are selected by conditional branching; or are both combined, to generate a new index used to evaluate the correctness of each of said test light sources.

26. The light source estimation method according to claim 2, wherein the test light source having the highest index of correctness among said plurality of test light sources is determined as the estimated light source.

27. The light source estimation method according to claim 2,
wherein the weighted averages of two or more light sources having high correctness among said plurality of test light sources is determined as the estimated light source.

28. The light source estimation method according to claim 26,
wherein a process, in which the light source with the highest index of correctness among said plurality of test light sources is initially selected, and different light sources obtained in finely divided vicinity of said selected light source are referenced to generate indexes of correctness for each light source, is repeated.

29. The light source estimation method according to claim 26,
wherein said test light sources include two or more categories according to physical light emission method; color temperature judgment processing based on an index indicating that, within each category, the color temperature is closest to the color temperature of the image-pickup light source, and light emission method judgment processing based on an index indicating that the light source is closest to the physical light emission method of the image-pickup light source, using the same or another index, are performed; and the estimated light source is determined from both the judgment results.

30. The light source estimation method according to claim 26,
wherein said test light sources include two or more categories according to physical light emission method, and the estimated light source is determined based on an index indicating a light source closest to the image-pickup light source, with respect only to a test light sources belonging to a category specified by the user or to a category provided by category judgment means differing from said estimation means.

31. The light source estimation method according to claim 2,
wherein the image-pickup light source determined by said estimation and a light source determined by an estimation method different from said estimation are conjoined by numeric means, are selected by conditional branching, or are both combined, to determine the final estimated light source.

32. An image-pickup apparatus in which from sensor response values obtained upon pickup of an image of an unspecified arbitrary object, image-pickup means having a plurality of different spectral sensitivity characteristics estimates spectral characteristics indicating color of an unknown image-pickup light source irradiating an object, and which uses, in color balance processing of the sensor response of said image-pickup means, the spectral characteristics which are the color of the estimated light source or parameters appropriate thereto, comprising:
storage means for storing, for each test light source, parameters for projecting said sensor response values into an evaluation space not dependent on said image-pickup light source by performing operations which can be calorimetrically approximated from a plurality of different said known spectral sensitivity characteristics of said image-pickup means and from the spectral characteristics of a plurality of test light sources assumed in advance;
projection conversion means for projecting said sensor response values into said evaluation space not dependent on the image-pickup light source using parameters stored in said storage means;
evaluation means for evaluating the correctness of said plurality of test light sources based on the image distribution state of sample values of an image scene projected by said projection conversion means;
light source estimation means for estimating the final image-pickup light source to be determined as the estimated light source by conjoining in numerical formulas, by selecting through conditional branching, or by combining both of, an image-pickup light source determined by said estimation and a light source determined by an estimation method different from said estimation; and
color balance adjustment means which uses spectral characteristics, which are the color of the estimated image-pickup light source, or parameters appropriate thereto in color balance processing of the sensor response of said image-pickup means.

33. An image processing method in which from sensor response values obtained upon pickup of an image of an unspecified arbitrary object, image-pickup means having a plurality of different spectral sensitivity characteristics estimates spectral characteristics indicating color of an unknown image-pickup light source irradiating an object; and which uses the spectral characteristics, which are the color of the estimated light source, or parameters appropriate thereto in color balance processing of the sensor response of said image-pickup means, comprising the steps of:
projecting said sensor response values into an evaluation space not dependent on the image-pickup light source through operations which can be calorimetrically approximated from spectral sensitivity characteristics of known image-pickup means and from spectral characteristics of an assumed test light source;
estimating the correct image-pickup light source by evaluating the correctness of a plurality of said test light sources based on a state of distribution of sampled values of the projected scene;
estimating the final image-pickup light source to be determined as the estimated light source by conjoining using numeric means, by selecting using conditional branching, or by both combined, the image-pickup light source determined by said estimation, and a light source determined by an estimation method different from said estimation; and
using, in color balance processing of the sensor response of said image-pickup means, spectral characteristics which are the color of the estimated image-pickup light source, or parameters appropriate thereto.

* * * * *